US006478949B1

(12) United States Patent
Hough et al.

(10) Patent No.: US 6,478,949 B1
(45) Date of Patent: *Nov. 12, 2002

(54) METHOD AND APPARATUS FOR INCREASING THE OXYGEN CONTENT OF WATER

(75) Inventors: Gary S. Hough, Woodinville, WA (US); Troy T. Johnson, Bellevue, WA (US)

(73) Assignee: H2O Technologies, Ltd., Milwaukie, OR (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/713,162

(22) Filed: Nov. 14, 2000

Related U.S. Application Data

(63) Continuation of application No. 08/744,706, filed on Oct. 31, 1996, now Pat. No. 6,171,469.

(51) Int. Cl.[7] .................................................. C02F 1/461
(52) U.S. Cl. ........................ 205/743; 205/744; 205/755; 205/756; 204/229.2; 204/229.4; 204/275.1
(58) Field of Search ................................ 204/743, 744, 204/755, 756, 229.2, 229.4, 275.1

(56) References Cited

U.S. PATENT DOCUMENTS

| 2,468,357 A | 4/1949 | Brown ........................ 204/248 |
| 2,864,750 A | 12/1958 | Hughes, Jr. et al. ........ 204/149 |
| 3,095,365 A | 6/1963 | Green ........................ 204/229 |
| 3,523,891 A | 8/1970 | Mehl ............................ 210/44 |
| 3,654,119 A | 4/1972 | White et al. ................. 204/228 |
| 3,728,245 A | 4/1973 | Preis et al. .................. 204/275 |
| 3,819,504 A | 6/1974 | Bennett ....................... 204/289 |
| 3,865,710 A | 2/1975 | Phipps ........................ 204/228 |
| 3,925,176 A | 12/1975 | Okert ........................... 204/152 |
| 3,943,044 A | 3/1976 | Fenn, III et al. ............ 204/149 |
| 4,017,375 A | 4/1977 | Pohto .......................... 204/255 |
| 4,119,517 A | 10/1978 | Hengst ........................ 204/229 |
| 4,132,620 A | 1/1979 | Nidola et al. ................ 204/242 |

(List continued on next page.)

FOREIGN PATENT DOCUMENTS

| WO | WO87 01690 | 3/1987 |
| WO | WO94 00216 | 1/1994 |
| WO | WO 95/21795 | 8/1995 |

OTHER PUBLICATIONS

The Advanced Water Systems Incorporated, company brochure regarding information on various products to improve water quality, different types of water systems and current technology, Sep. 30, 1993.

*Primary Examiner*—Arun S. Phasge
(74) *Attorney, Agent, or Firm*—Seed Intellectual Property Law Group PLLC

(57) ABSTRACT

A method and apparatus for increasing the oxygen content of water have been shown and described. A volume of water is passed between the electrodes of an electrolytic cell, a portion of the volume of water converting to dissolved oxygen. A desired level of dissolved oxygen is selected, and the number of times the volume of water must flow through the electrolytic cell to ensure that the volume of water contains the selected percentage of dissolved oxygen is also selected. The volume of water is then forced through the cell the selected number of times, such that the volume of water contains the desired percentage of dissolved oxygen. The electrolytic cell is in fluid communication with a tank and a pump, the pump drawing the volume of water from the tank and forcing it through the electrolytic cell and back into the tank. The volume of water is thereby recirculated through the electrolytic cell by the pump for the selected number of times.

13 Claims, 4 Drawing Sheets

U.S. PATENT DOCUMENTS

| | | | |
|---|---|---|---|
| 4,160,716 A | 7/1979 | Wiseman | 204/270 |
| 4,180,445 A | 12/1979 | Bennett et al. | 204/129 |
| 4,312,736 A | 1/1982 | Menth et al. | 204/255 |
| 4,385,973 A | 5/1983 | Reis et al. | 204/149 |
| 4,419,206 A | 12/1983 | Frame | 204/228 |
| 4,425,216 A | 1/1984 | Neymeyer | 204/270 |
| 4,436,601 A | 3/1984 | Branchick et al. | 204/149 |
| 4,451,341 A | 5/1984 | Miller | 204/149 |
| 4,528,083 A | 7/1985 | LaConti et al. | 204/265 |
| 4,572,775 A | 2/1986 | Paniagua | 204/229 |
| 4,623,436 A | 11/1986 | Umehara | 204/149 |
| 4,639,303 A | 1/1987 | Staab et al. | 204/258 |
| 4,761,208 A | 8/1988 | Gram et al. | 204/95 |
| 4,781,805 A | 11/1988 | Dahlgren | 204/149 |
| 4,783,246 A | 11/1988 | Langeland et al. | 204/95 |
| 4,784,735 A | 11/1988 | Sorenson | 204/98 |
| 4,790,914 A | 12/1988 | Sorenson | 204/98 |
| 4,797,182 A | 1/1989 | Beer et al. | 204/14.1 |
| 4,839,007 A | 6/1989 | Kötz et al. | 204/149 |
| 4,917,782 A | 4/1990 | Davies | 204/152 |
| 4,936,979 A | 6/1990 | Brown | 210/85 |
| 5,062,940 A | 11/1991 | Davies | 204/228 |
| 5,292,412 A | 3/1994 | Pitton | 204/149 |
| 5,324,398 A | 6/1994 | Erickson et al. | 204/149 |
| 5,328,584 A | 7/1994 | Erickson et al. | 204/229 |
| 5,389,214 A | 2/1995 | Erickson et al. | 204/149 |
| 5,427,667 A | 6/1995 | Bakhir et al. | 204/260 |
| 5,460,702 A | 10/1995 | Birkbeck et al. | 205/701 |
| 5,728,287 A | 3/1998 | Hough et al. | 205/743 |
| 6,171,469 B1 * | 1/2001 | Hough et al. | 205/743 |

* cited by examiner

METHOD AND APPARATUS FOR INCREASING THE OXYGEN CONTENT OF WATER

CROSS-REFERENCE TO RELATED APPLICATION

This application is a continuation of U.S. patent application Ser. No. 08/744,706, filed Oct. 31 1996 now U.S. Pat. No. 6,171,469.

TECHNICAL FIELD

This invention relates to the electrolytic generation of oxygen, and more particularly, to an improved method and apparatus for increasing the dissolved oxygen content of water.

BACKGROUND OF THE INVENTION

Many benefits may be obtained through the use of water containing an elevated quantity of dissolved oxygen. For example, certain studies have shown that animals such as chickens and turkeys grow heavier for a given grain consumption if their drinking water has elevated oxygen levels. Increased levels of oxygen in water also act to purify the water, killing a variety of biological and chemical contaminants, as is known in the art. Further, it is believed that humans may obtain certain health benefits by consuming oxygenated water.

The oxygen content of water may be increased via electrolysis, a process that is well known in the art. Typically, current is supplied to a cathode and an anode positioned in a water solution. The passage of electricity through the solution splits the water molecule causing the formation of hydrogen and oxygen gas. The hydrogen tends to bubble out of solution, whereas a certain quantity of the oxygen molecules are trapped by the water molecules and remain in solution, thereby increasing the dissolved oxygen content of the water.

Currently available systems for oxygenating water with electrolytic cells may not reach desired levels of dissolved oxygen, nor do they function as efficiently as desired. Accordingly, there is a need in the art for an improved system for increasing the dissolved oxygen content of water to desired levels at an improved efficiency and speed.

SUMMARY OF THE INVENTION

Briefly, the present invention provides an improved method and apparatus for increasing the oxygen content of water. The oxygenated water may then be used for a variety of purposes.

In a preferred embodiment, a volume of water is passed between the electrodes of an electrolytic cell to which a current is applied. The water is recirculated, such that a given volume of water is ensured of passing between the electrodes a selected number of times. During each pass through the cell, some percentage of the volume of water turns into dissolved oxygen. In a preferred embodiment, the volume of water is passed between the electrodes a selected number of times such that the volume of water contains a desired amount of dissolved oxygen.

The number of passes is selected to reach the desired oxygen level as efficiently as possible. According to principles of the present invention, after a selected number of passes, additional passes only increase the oxygen level slightly. For example, after the same volume of a selected water sample has circulated 14–16 times through the cell, it reaches a desired oxygen level. While additional circulation of the same volume of water does increase the oxygen level, it is only a modest increase. According to one alternative embodiment, the preferred number of passes for a particular volume of water varies with the particular properties of the water. As will be appreciated, water with a high iron content may require a different number of passes to reach the preferred dissolved oxygen level than soft water, hard water, slightly salty water, or the like. The differences of mineral and salt content of water from various sources is so great with even slight variations affecting the results, that a test is preferably conducted to determine the preferred number of passes for each particular water source. After the water source has been tested and the correct number of passes selected, then the system can be set to ensure that the desired number of passes occur before water is discharged by the system.

For example, in one embodiment, the electrolytic cell has eight electrodes, each electrode having a length of 6 inches and a width of 1.5 inches. A current of 1.5 amperes is applied to the electrodes, and a volume of water flows past the electrodes at a rate of 3.8 gallons per minute. For the volume of water to reach a desired dissolved oxygen content of 13–17 parts per million (ppm), the volume of water is passed between the electrodes 15–55 times. The water is recirculated in this manner until the volume of water has completed the specified number of passes through the cell.

DETAILED DESCRIPTION OF THE INVENTION

Figure 1:
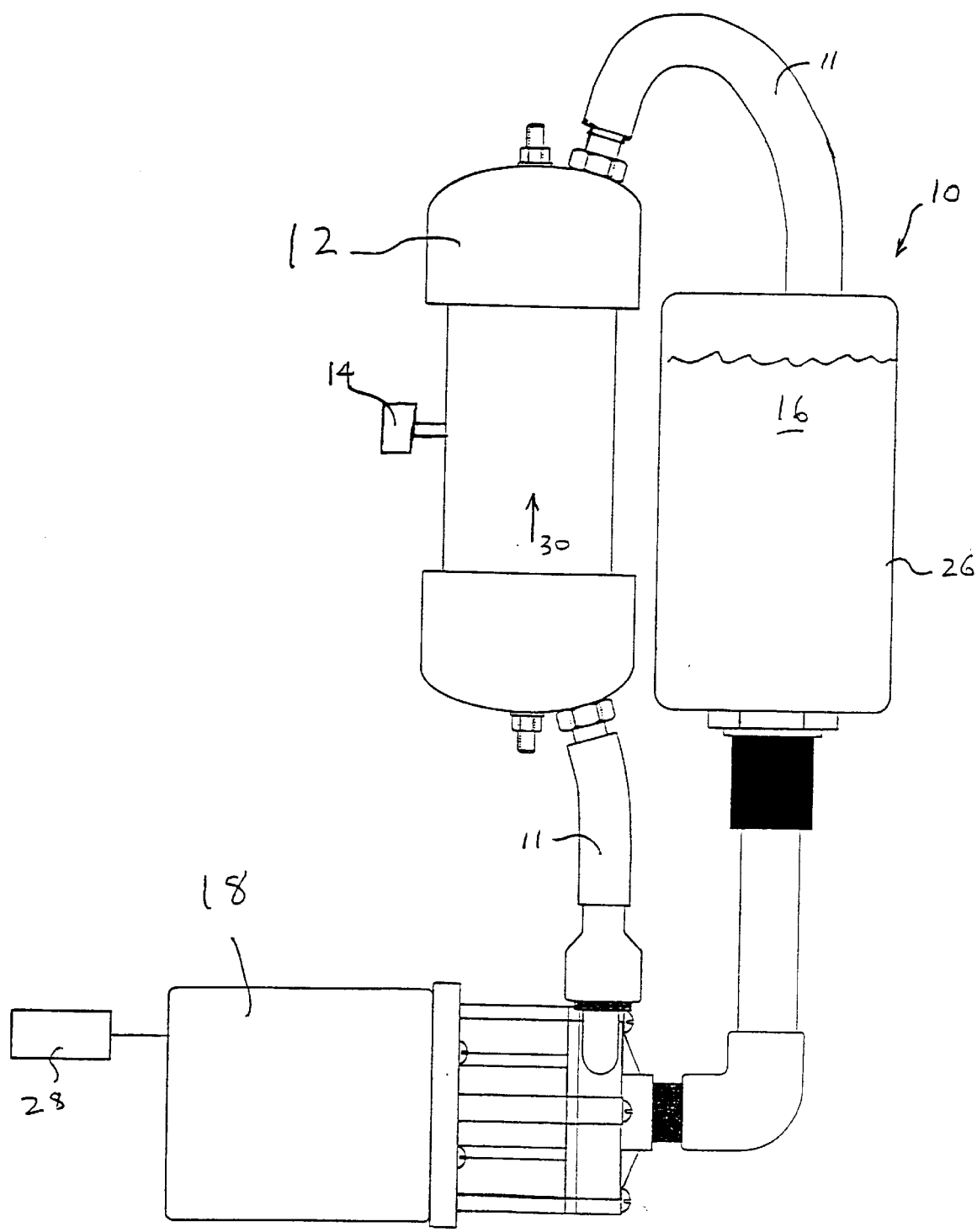
FIG. 1 is a front elevational view illustrating a system provided in accordance with a preferred embodiment of the present invention.

As illustrated in FIG. 1, an apparatus 10 includes an electrolytic cell 12 in series fluid communication with a tank 26 that holds a volume of water 16. Both the tank 26 and electrolytic cell 12 are in series fluid communication with a pump 18.

All water that exits from the tank 20 must pass through the cell 12. The water is returned to the top of the cell and drawn from the bottom so that generally most of the water passes through the cell before any of the water passes through the cell a second time. While there may be some mixing as the water is returned so that there is a possibility that some small volume of water will pass through the cell a second time before some has passed through once, the tank and outlet, inlet and pump are positioned to maximize the series flow of each volume of water.

Figure 2A:
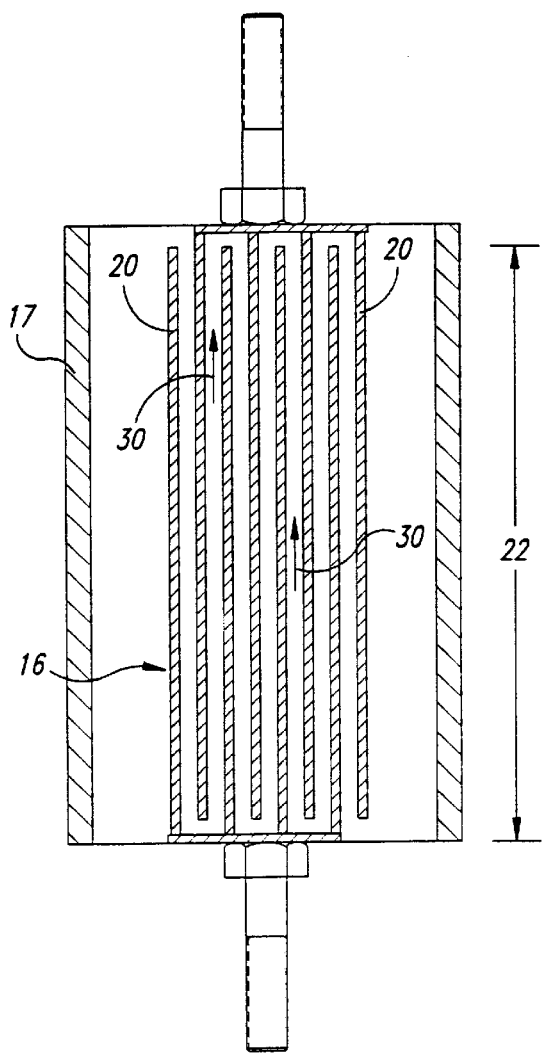
FIG. 2A is a partial cross-sectional elevational view of an exemplary electrolytic cell used in the system illustrated in FIG. 1.
Figure 2B:
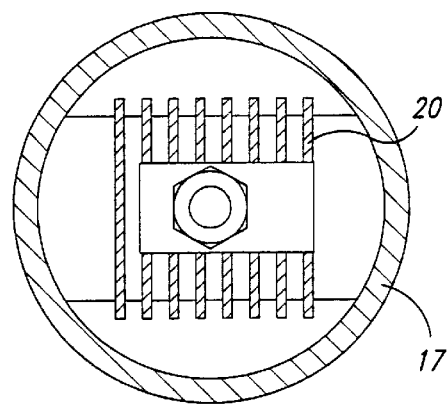
FIG. 2B is a top plan view of the electrolytic cell illustrated in FIG. 2A.
Figure 2C:
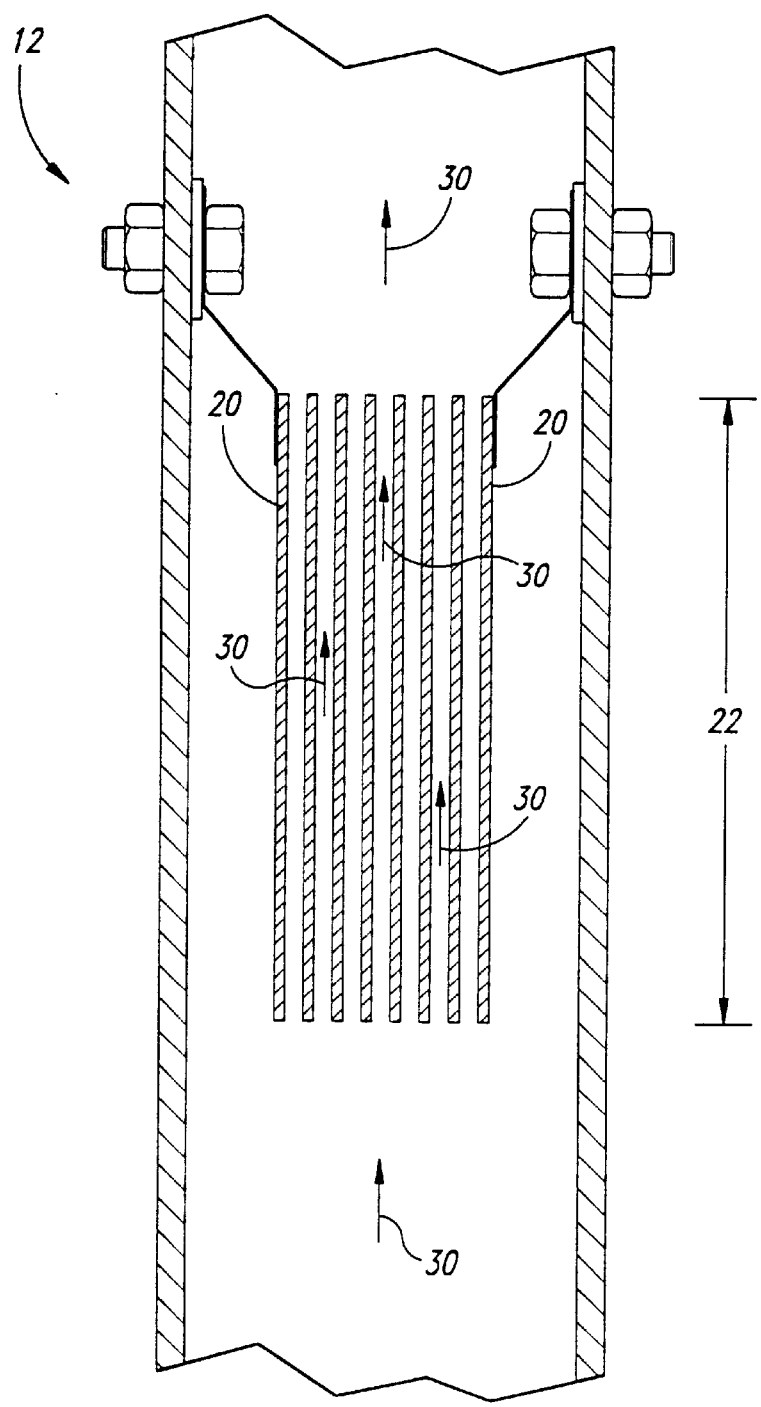
FIG. 2C is a cross-sectional elevational view of an alternative, exemplary electrolytic cell.

FIGS. 2A and 2B show an electrolytic cell 12 for treating water to increase the dissolved oxygen within the water. An alternative electrolytic cell is illustrated in FIG. 2C. Two examples of an electrolytic cell are provided for background purposes. However, it is to be understood that any one of the many suitable electrolytic cells for generating dissolved oxygen in water are acceptable.

As illustrated in FIG. 2, the electrolytic cell 12 includes a plurality of electrodes 20. The electrodes may be made of a variety of material such as nickel, stainless steel, or hastaloy; however, in a preferred embodiment, they are made of titanium. Any acceptable coating of the type known in the art is acceptable. The electrodes are coupled to a source 14 of electrical current, such that as a volume of water flows through the electrolytic cell in the direction illustrated by reference arrow 30, electrolysis occurs, generating hydrogen and oxygen. The hydrogen bubbles out of solution, while a certain amount of the oxygen remains trapped by the volume of water, increasing the dissolved oxygen content of the volume of water.

Figure 3:
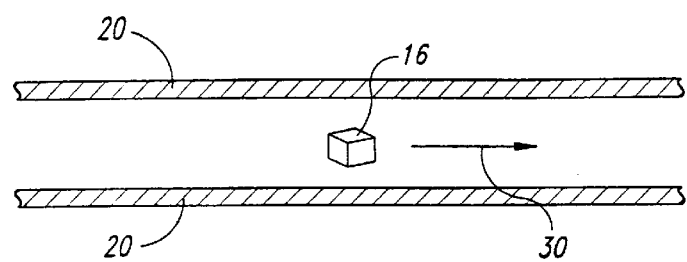
FIG. 3 is an enlarged, schematic illustration of a volume of water being treated in accordance with a preferred embodiment of the present invention.

In a preferred embodiment of the present invention, a specified volume of water 16 reaches a selected content level of dissolved oxygen by passing through the electrolytic cell a selected number of times. As illustrated in FIG. 3, every time a selected volume of water 16 passes between two electrodes 20 along the length 22 of the electrodes, a portion of the volume of water converts from water to dissolved oxygen. The volume of water is passed through the cell a selected number of times, such that a specified amount of the given volume of water contains a desired percentage of dissolved oxygen. The volume of water 16 illustrated in FIG. 3 contains some given percentage of water molecules and some given percentage of dissolved oxygen before the first pass. After the first pass, the percentage of water molecules in that volume has decreased and the percentage of dissolved oxygen has increased. The ratio continues to change with each pass of the volume of water. After a selected number of passes, the dissolved oxygen is sufficiently high that it is usable for the desired purpose and the water is provided at the outlet for use by the user.

Figure 4:
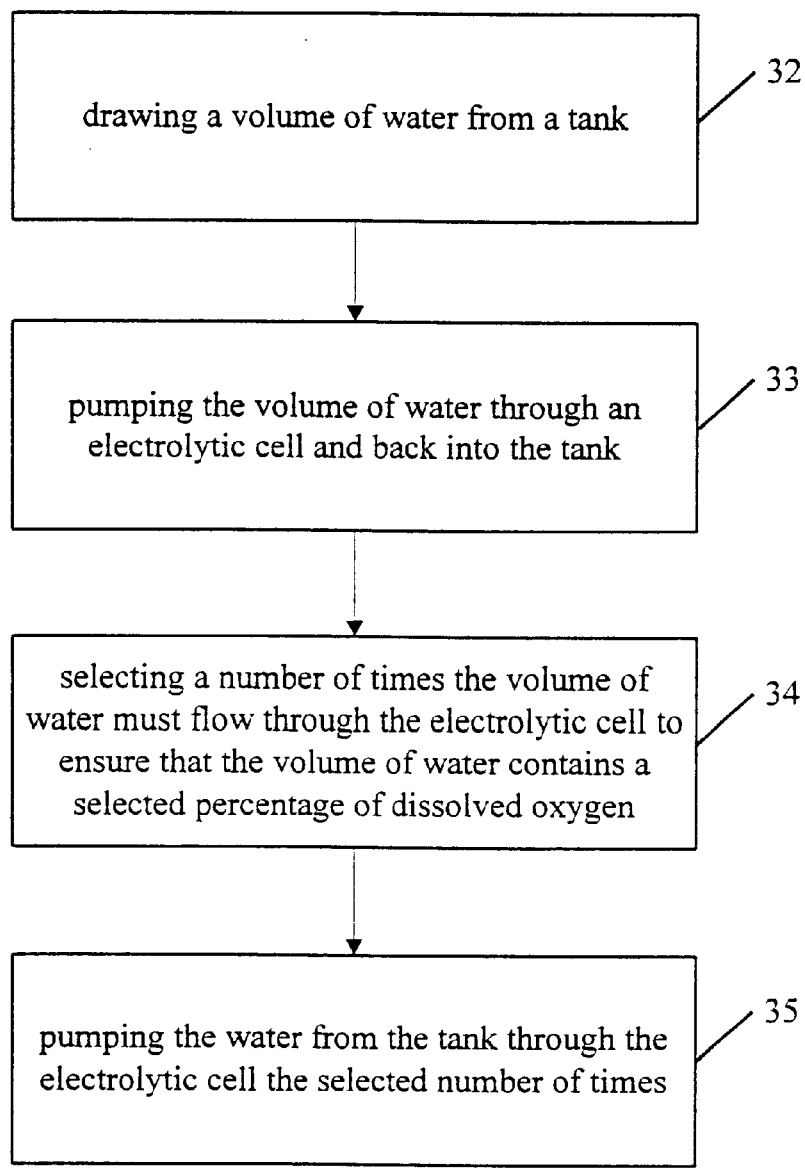
FIG. 4 is a schematic illustration of the steps of a preferred embodiment of the present invention.

In operation, therefore, as illustrated in FIGS. 1 and 4, the pump draws a volume of water from the tank, step 32, and forces it through the electrolytic cell, step 33, in the direction indicated by reference arrow 30. The water then flows from the electrolytic cell back into the tank. The number of times the volume of water must flow through the cell to ensure that the volume of water contains a desired percentage of dissolved oxygen has been previously selected in most embodiments, so that step 34 is not present. The water will circulate the preset number of times and then is ready for use. The number of particle passes is automatically controlled, such as with a timer, and the volume of water is forced to flow through the cell the selected number of times, step 35. However, in some embodiments, the user or operator will select the desired number of particle passes, step 34, and the water will circulate the selected time.

In a preferred embodiment, a water sample from a given source is tested to determine the characteristics of the water. For example, if the water has a relatively high salt content, the water will be more conductive, and will reach a desired dissolved oxygen level in fewer passes. The system is therefore calibrated by testing the sample of water to determine the number of passes through the cell required to reach a desired dissolved oxygen content in an efficient manner. The system is then set to provide the proper number of particle passes to achieve the desired dissolved oxygen level.

One example is illustrated in Table 1 below. A given water sample has an initial dissolved oxygen content of 8.5 ppm. In the table, the number of particle passes has been rounded to the nearest whole number.

TABLE 1

| No. of Passes | Elapsed Time sec | Dissolved Oxygen (D.O.) ppm | % Change in D.O. |
| --- | --- | --- | --- |
|  | 0 | 8.5 |  |
| 5 | 20 | 9.7 | 14.12 |
| 10 | 40 | 10.8 | 11.34 |
| 14 | 60 | 12.5 | 15.74 |
| 19 | 80 | 13.8 | 10.40 |
| 24 | 100 | 14.2 | 2.90 |
| 29 | 120 | 15.1 | 6.34 |
| 34 | 140 | 15.5 | 2.65 |
| 39 | 160 | 15.9 | 2.58 |
| 43 | 180 | 16.5 | 3.77 |
| 48 | 200 | 16.7 | 1.21 |
| 53 | 220 | 17.1 | 2.40 |
| 58 | 240 | 17.1 | 0.00 |
| 63 | 260 | 17.9 | 4.68 |
| 68 | 280 | 18.1 | 1.12 |

In this example, the volume of water of 1000 ml flows at 3.8 gallons per minute (gpm) through an electrolytic cell having eight electrodes, each electrode being a flat plate having a length of six inches and a width of one-and-a-half inches of the type shown in FIGS. 1A and 1B. A current of 1.8 amps is applied to the cell. It is possible to increase the dissolved oxygen content by 82%, up to 15.5 ppm, in 34 passes. Although running the sample through the cell an addition 34 times will increase the dissolved oxygen content, it does so only slightly, namely by 17% to 18.1 ppm dissolved oxygen. If the user is primarily concerned with insuring that the dissolved oxygen content falls within a selected range, for example, 13–17 ppm, the number of passes will be selected based on how many are required to achieve a dissolved oxygen content of 13 ppm and a dissolved oxygen content of 17 ppm. In example 1, the number of passes required to achieve this range of dissolved oxygen is 16–52 passes. As can be seen from the data in Table 1, although running the volume of water through the cell for additional passes increases the dissolved oxygen content slightly, the percent change is small, and does not justify the additional energy input to the system. Alternatively, if a user's primary concern is maximizing the increase in dissolved oxygen for a given energy input, the system would be designed to stop between 19 and 24 passes, which is where a significant decrease in percent change of dissolved oxygen occurs. It will of course be understood that the desire for a selected dissolved oxygen content and a desire for efficiency may both be met, and weighted according to the particular user and desired application.

Similar results were obtained in separate tests, illustrated in Tables 2 and 3 below.

TABLE 2

| No. of Passes | Elapsed Time sec | Dissolved Oxygen (D.O.) ppm | % Change in D.O. |
| --- | --- | --- | --- |
|  | 0 | 9.2 |  |
| 5 | 20 | 9.9 | 7.61 |
| 10 | 40 | 11.3 | 14.14 |
| 14 | 60 | 13.3 | 17.70 |
| 19 | 80 | 13.7 | 3.01 |

TABLE 2-continued

| No. of Passes | Elapsed Time sec | Dissolved Oxygen (D.O.) ppm | % Change in D.O. |
|---|---|---|---|
| 24 | 100 | 14.2 | 3.65 |
| 29 | 120 | 15.2 | 7.04 |
| 34 | 140 | 15.9 | 4.61 |
| 39 | 160 | 16.6 | 4.40 |
| 43 | 180 | 17 | 2.41 |
| 48 | 200 | 17.2 | 1.18 |
| 53 | 220 | 17.7 | 2.91 |
| 58 | 240 | 18.1 | 2.26 |
| 63 | 260 | 18.4 | 1.66 |
| 68 | 280 | 18.9 | 2.72 |

TABLE 3

| No. of Passes | Elapsed Time sec | Dissolved Oxygen (D.O.) ppm | % Change in D.O. |
|---|---|---|---|
|  | 0 | 9.2 |  |
| 5 | 20 | 9.9 | 7.61 |
| 10 | 40 | 11.1 | 12.12 |
| 14 | 60 | 12.8 | 15.32 |
| 19 | 80 | 13.9 | 8.59 |
| 24 | 100 | 14.5 | 4.32 |
| 29 | 120 | 15.4 | 6.21 |
| 34 | 140 | 15.8 | 2.60 |
| 39 | 160 | 16.3 | 3.16 |
| 43 | 180 | 16.8 | 3.07 |
| 48 | 200 | 17.2 | 2.38 |
| 53 | 220 | 17.6 | 2.33 |
| 58 | 240 | 17.8 | 1.14 |
| 63 | 260 | 17.9 | 0.56 |
| 68 | 280 | 18.5 | 3.35 |

As illustrated in Table 2, if a dissolved oxygen content of 13–17 ppm is desired, the volume of water is passed through the electrolytic cell 17–44 times. Beyond 44 passes, the percent increase in dissolved oxygen is substantially less significant than the increase in dissolved oxygen achieved up to that point. If a desired dissolved oxygen content is in a lower range, or efficiency is the primary concern of the user, the user may choose to stop processing the water at approximately 20 passes, where the percent change of dissolved oxygen drops off. Similar results are illustrated in Table 3. Therefore, for every sample of water processed in accordance with the present invention, there is a point of diminishing returns, where a slight increase of dissolved oxygen content may not justify the required input of energy. The system provided in accordance with the present invention is therefore calibrated to reach a desired dissolved oxygen content in an efficient manner by passing the water through an electrolytic cell for only a selected number of times.

In a preferred embodiment, the pump 18 is variable, such that the volume of water is forced through the electrolytic cell 12 at a selected rate. Pump 18 is coupled to a timer 28, such that the water is forced through the cell for a selected period of time, the flow rate and time being selected to ensure that the volume of water passes through the electrolytic cell the selected number of times.

For example, the electrodes 20 of the cell 12 may each have a length of 6–12 inches, and a width of 1.5–2 inches, a current of 1–30 amperes being applied to the electrodes. Depending on the desired use of the treated water, a content of dissolved oxygen is selected. In a preferred embodiment, it is believed that many benefits may be achieved through the use of water having a dissolved oxygen content of 13–17 ppm. To ensure that the volume of water contains this level of dissolved oxygen, the volume of water is passed through the electrolytic cell 15–55 times. If the selected volume of water to be treated changes, the flow rate and/or time are adjusted accordingly, to ensure that the volume of water flows through the cell the selected number of times.

In a preferred embodiment, an inner diameter of the tubing 11 is selected to ensure that the system will move the water at or above a selected flow rate. It will be understood that the size of the tubing will vary with the scale of the system; however, in a preferred embodiment, the tubing 11 has a diameter of 0.5 inch. To further ensure that a desired flow rate is achieved, the tubing is configured to eliminate flow restrictions.

A method and apparatus for increasing the dissolved oxygen content of a volume of water to a selected level have been shown and described. From the foregoing, it will be appreciated that although embodiments of the invention have been described herein for purposes of illustration, including specific examples, various modifications may be made without deviating from the spirit of the invention. Thus, the present invention is not limited to the embodiments described herein, but rather is defined by the claims which follow.

What is claimed is:

1. A method for increasing the dissolved oxygen content of a volume of water to a selected level comprising:
    selecting a number of times for the volume of water to flow between electrodes of an electrolytic cell, wherein the selected number of times is greater than two (2), the number of times being selected to obtain a desired amount of dissolved oxygen within the water; and
    forcing the volume of water to flow between the electrodes the selected number of times to obtain the desired amount of dissolved oxygen.

2. The method according to claim 1, further comprising:
    forcing the entire volume of water to flow between the electrodes at a selected rate for a selected period of time such that the entire volume of water flows between the electrodes the selected number of times.

3. The method according to claim 1, further comprising:
    testing the volume of water to determine the number of times the volume of water must flow between electrodes of an electrolytic cell to reach a desired percentage of dissolved oxygen in an efficient manner.

4. A method for increasing the dissolved oxygen content of a volume of water using an electrolytic cell comprising:
    selecting in advance a time period for the water to pass through the electrolytic cells, prior to starting the flow of the water through the electrolytic cell;
    setting a timer to the selected time period;
    providing a current through an electrolytic cell having a plurality of electrodes for the selected time period, each electrode having a selected length and width;
    forcing the volume of water to flow through the electrolytic cell at a selected flow rate; and
    passing the entire volume of water through the cell to achieve a number of passes, the number of passes being greater than two (2), such that the entire volume of water reaches the increased dissolved oxygen content after the selected time period.

5. The method according to claim 4 wherein the current is 1–30 amperes, the length is 6–12 inches, the width is 1.5–2 inches, the dissolved oxygen content is 13–17 parts per million and the selected number of times is 15–55.

6. The method according to claim 4, further comprising:

forcing the entire volume of water to flow between the electrodes at a selected rate for a selected period of time such that the entire volume of water flows between the electrodes the selected number of times.

7. A method for increasing the dissolved oxygen content of a volume of water comprising:

drawing a volume of water from a tank;

pumping the volume of water through an electrolytic cell and back into the tank a selected number of times, the number of times being selected based on a desired percentage change in dissolved oxygen and also based on an efficient energy use for creating the dissolved oxygen; and discharging the volume of water from the tank after it has passed through the electrolytic cell the selected number of times.

8. A method for increasing the dissolved oxygen content of a volume of water comprising:

placing a volume of water in a tank;

setting a timer for the selected time period;

pumping the volume of water through an electrolytic cell for a time period which has been selected in advance and set in the timer at a selected volumetric flow rate so that the entire volume of water makes a plurality of passes through the electrolytic cell during the selected time period; and discharging the water from the tank after the selected time period.

9. The method according to claim 8, wherein the selected number of passes is greater than fourteen (14).

10. The method according to any one of claims 1, 2, 4, 7 and 8, wherein the selected number of passes is greater than four (4) and less than twenty-four (24).

11. The method according to any one of claims 1, 2, 4, 7, or 8, wherein the selected number of passes is greater than nineteen (19).

12. The method according to any one of claims 1, 2, 4, 7 or 8, wherein the selected number of passes is greater than fourteen (14) and less than twenty-four (24).

13. The method according to any one of claims 1 and 4, wherein the selected number of passes is less than twenty-four (24).

* * * * *